UNITED STATES PATENT OFFICE.

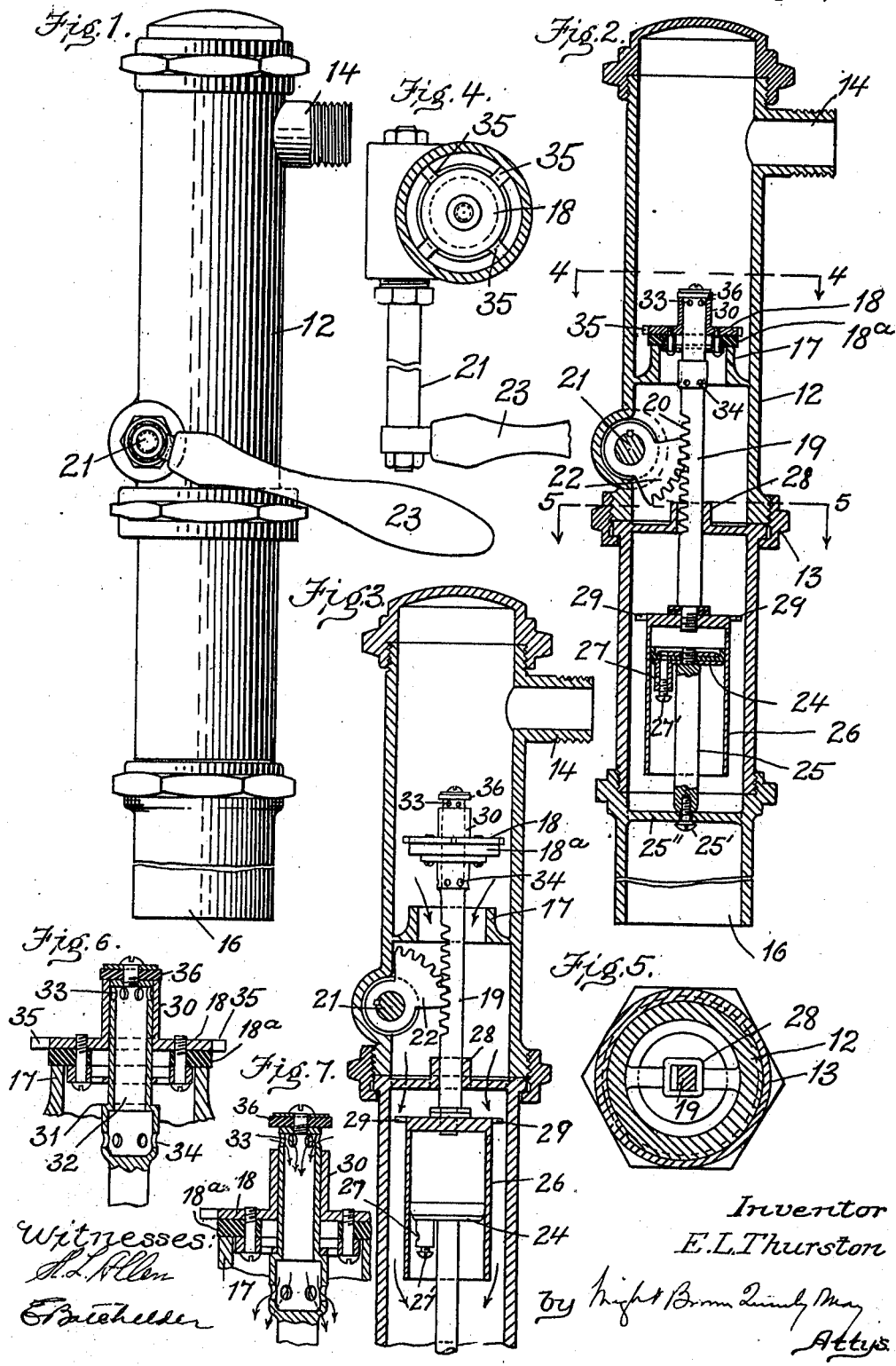
E. L. THURSTON.
FLUSHING APPARATUS.
APPLICATION FILED APR. 29, 1910.
988,522.
Patented Apr. 4, 1911.
Inventor
E. L. Thurston

EDWIN LANGDON THURSTON, OF BOSTON, MASSACHUSETTS.

FLUSHING APPARATUS.

988,522.

Specification of Letters Patent. Patented Apr. 4, 1911.

Application filed April 29, 1910. Serial No. 558,515.

*To all whom it may concern:*

Be it known that I, EDWIN LANGDON THURSTON, of Boston, in the county of Suffolk and State of Massachusetts, have invented certain new and useful Improvements in Flushing Apparatus, of which the following is a specification.

This invention relates to an appliance for flushing water closet bowls, et cetera, and has for its object to provide a simple and compact apparatus including a valve which is held closed by water pressure, means for opening the valve against the water pressure, and means for retarding the closing movement of the valve to produce a flow of the desired duration.

The invention consists in the improved apparatus which I will now proceed to describe and claim.

Of the accompanying drawings, forming a part of this specification,—Figure 1 represents a side elevation of a flushing apparatus embodying my invention. Fig. 2 represents a longitudinal section of the same, the valve being closed. Fig. 3 represents a view similar to Fig. 2, showing the valve open and in the act of closing. Fig. 4 represents a section on line 4—4 of Fig. 2. Fig. 5 represents a section on line 5—5 of Fig. 2. Figs. 6 and 7 represent sectional views illustrating the by-pass hereinafter referred to.

Same reference characters indicate the same or similar parts in all the figures.

In the drawings, 12 represents a conduit which is preferably of cylindrical form and is considerably elongated in proportion to its diameter. The conduit may be made in one or more sections. As illustrated, it comprises two sections connected by a union 13, which permits said sections to be readily disconnected to obtain access to the interior of the conduit. At one end portion of the conduit is a branch constituting an inlet 14, adapted to be connected with a source of supply of water under pressure. The opposite end 16, of the conduit constitutes an outlet which may be connected in any suitable way with the closet bowl to be flushed. The conduit is sub-divided between its inlet and outlet by a partition which includes an annular valve seat 17.

The portion of the conduit between the valve seat and the inlet constitutes a valve chamber, in which is a valve adapted to be closed upon the seat 17 by the liquid pressure in said chamber. Said valve as here shown includes a metal disk 18, and a compressible washer 18ª attached thereto and formed to bear upon the valve seat.

19 represents a stem connected with the valve and extending through the valve seat toward the outlet end of the conduit. The valve stem is provided with gear teeth 20, constituting a rack.

21 represents a rock shaft journaled in bearings on one side of the conduit and provided within the latter with a gear segment 22, meshing with the rack 20. Said rock shaft is provided with a handle or lever 23 whereby it may be turned to cause the elevation of the valve stem and the opening of the valve.

The conduit and valve stem are provided respectively with members of a retarding device adapted to retard the closing movement of the valve, one of the said members being affixed to the conduit and the other to the valve stem. As here shown, the fixed member of the retarding device is a piston 24, attached to a stem or rod 25, which is secured by a screw 25', or otherwise, to a fixed cross-bar 25" within the conduit and near the outlet end of the same. The movable member of the retarding device is an inverted dash-pot 26, which is attached to the lower end of the valve stem and has a close sliding fit on the piston. The piston has a vent 27 comprising a nipple having an air passage which may be regulated by means of a screw 27'.

28 represents a fixed guide for the valve stem, said guide and the stem being formed to prevent the stem from turning. The dash-pot may have radiating ears 29 to bear against the inner wall of the conduit to guide it.

When the valve stem is raised, it opens the valve and moves the dash-pot upward, thus causing air to enter the upper portion of the dash-pot through the vent 27. The structure of the piston 24 with the cup leather as illustrated, is such that air can pass it with some freedom during upward movement of the dash pot cylinder so as to enable the valve to be opened quickly without tendency to produce a vacuum in said cylinder. When the lever 23 is released, the valve and stem move by gravitation, aided by the pressure of water on the inlet side of the valve in the direction required to close the valve, and also aided by the water, as it escapes, acting on the upper end of the dash pot 26. The closing movement of the valve is retarded by the air contained in the dash-pot, the air escaping slowly through the vent 27 until the valve is closed. Provision is therefore made for a flushing flow of any desired duration, the duration of flow depending on the size of the vent 27.

To permit an easy opening movement of the valve, I provide means for forming a by-pass through the valve before the latter is opened, thereby so reducing the pressure at the inlet side of the valve that the force required to open the valve is materially reduced. To this end, I provide the valve disk 18, with an upwardly projecting sleeve 30, which is open at its upper end. I also make the valve stem independently movable to a limited extent relatively to the valve so that it may be given an initial upward movement independent of the valve, the valve stem being provided with a shoulder 31 which abuts against the under side of the valve when said initial movement has been accomplished, the shoulder causing the valve to move with the stem.

The upper portion of the valve stem is tubular and has a passage 32 extending through the valve. The upper end of the passage 32 has water inlets 33, while its lower portion has water outlets 34 below the shoulder 31, the arrangement being such that when the valve and stem are in their lowest positions, the inlets 33 are closed by the sleeve 30 as shown in Fig. 6, but the outlets 34 are never closed or obstructed. The initial upward movement of the valve stem causes the inlets 33 to rise before the sleeve 30, as shown in Fig. 7, a by-pass through the valve being thus formed before the valve is opened. The pressure of the liquid on the inner side of the valve is sufficiently reduced by the formation of the by-pass to materially reduce the resistance to the opening movement of the valve, this movement taking place after the shoulder 31 contacts with the valve.

The valve is provided with ears 35, which are in sliding contact with the interior conduit and prevent lateral displacement of the valve. To the upper end of the valve stem is attached a washer 36 of compressible material which bears on the upper end of the sleeve 30 when the valve stem is depressed, and prevents leakage through the crevice between the stem and the inner surface of the sleeve 30.

I claim:—

1. A flushing apparatus comprising an elongated conduit having an inlet at one end portion and an outlet at its opposite end portion, a valve seat adjacent to the inlet and a fixed piston between the valve seat and the outlet, a valve adapted to be closed on said seat by liquid pressure, said valve having a sleeve, a tubular stem extending through said sleeve and provided with an inverted dash-pot fitting said piston and movable thereon, an air passage being provided for the admission of air to said dash pot, said tubular stem having openings near its upper end and also below said sleeve and having a limited sliding movement in the sleeve.

2. A flushing apparatus comprising an elongated conduit having an inlet at one end portion and an outlet at its opposite end portion, a valve seat adjacent to the inlet, and a fixed retarding member adjacent to the outlet, a valve adapted to be closed on said seat by liquid pressure, and provided with a sleeve, a tubular stem extending through said sleeve, and provided with an inverted dash pot cylinder within the conduit in the path of outflowing water and adapted to coöperate with said fixed member in confining a body of air to retard the closing of the valve, and means for opening the valve against the liquid pressure, the stem being movable to a limited extent independently of the valve and having upper and lower side openings which provide a by-pass for the escape of water around the valve when the stem is first moved and before the valve is opened.

3. A flushing apparatus comprising an elongated conduit having an inlet at one end portion and an outlet at its opposite end portion, a valve seat adjacent to the inlet, and a fixed piston in the conduit, a valve adapted to be closed on said seat by liquid pressure, and provided with a central sleeve, a valve stem passing through the valve seat, valve and sleeve, and independently movable endwise therein to a limited extent, an inverted dash-pot carried by said stem in the path of outflowing water to coöperate with said fixed member in confining a body of air to retard the closing of the valve, said stem having a tubular portion provided with inlets and outlets located respectively at the inlet and outlet sides of the valve and having a shoulder intermediate the inlets and outlets to engage said valve sleeve, and means for moving the stem in the direction required to open the valve, the initial movement of the stem causing the tubular portion of the stem to serve as a by-pass before the valve is opened.

In testimony whereof I have affixed my signature, in presence of two witnesses.

EDWIN LANGDON THURSTON.

Witnesses:
C. F. BROWN,
P. W. PEZZETTI.

Copies of this patent may be obtained for five cents each, by addressing the "Commissioner of Patents, Washington, D. C."